(12) United States Patent
Jin et al.

(10) Patent No.: US 12,401,019 B2
(45) Date of Patent: Aug. 26, 2025

(54) ALL-SOLID-STATE BATTERY USING LITHIUM METAL FOR NEGATIVE ELECTRODE

(71) Applicant: LG CHEM, LTD., Seoul (KR)

(72) Inventors: Guilong Jin, Daejeon (KR); Sung-Joong Kang, Daejeon (KR); Eun-Bee Kim, Daejeon (KR); Ji-Hoon Ryu, Daejeon (KR); Suk-Woo Lee, Daejeon (KR); Jung-Pil Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 863 days.

(21) Appl. No.: 16/972,171

(22) PCT Filed: Aug. 20, 2019

(86) PCT No.: PCT/KR2019/010598
§ 371 (c)(1),
(2) Date: Dec. 4, 2020

(87) PCT Pub. No.: WO2020/040533
PCT Pub. Date: Feb. 27, 2020

(65) Prior Publication Data
US 2021/0242446 A1    Aug. 5, 2021

(30) Foreign Application Priority Data

Aug. 23, 2018  (KR) .................. 10-2018-0098857

(51) Int. Cl.
*H01M 4/134* (2010.01)
*H01M 4/36* (2006.01)
(Continued)

(52) U.S. Cl.
CPC .......... *H01M 4/134* (2013.01); *H01M 4/366* (2013.01); *H01M 4/382* (2013.01); *H01M 4/628* (2013.01);
(Continued)

(58) Field of Classification Search
CPC .................................... H01M 4/366
See application file for complete search history.

(56) References Cited

U.S. PATENT DOCUMENTS 5,612,153 A    3/1997  Moulton et al.
2011/0129696 A1  6/2011  Baek
(Continued)

FOREIGN PATENT DOCUMENTS

EP    1 041 657 A2    10/2000
EP    3 428 998 A1    9/2017
(Continued)

OTHER PUBLICATIONS

International Search Report (PCT/ISA/210) issued in PCT/KR2019/010598, dated Nov. 26, 2019.
(Continued)

*Primary Examiner* — Matthew T Martin
*Assistant Examiner* — Krishna R Hammond
(74) *Attorney, Agent, or Firm* — Birch, Stewart, Kolasch & Birch, LLP

(57) ABSTRACT

The present disclosure relates to an electrode assembly for an all-solid-state battery with improved safety, and more particularly, to an electrode assembly of a new structure designed to prevent the damage of a solid electrolyte layer caused by a step formed in a negative electrode layer due to changes in thickness of the negative electrode layer, such as an increase or decrease in thickness at part of the negative electrode layer, during charging/discharging. The electrode assembly is characterized by comprising a protective layer
(Continued)

having an opening, interposed between the negative electrode and the solid electrolyte layer.

19 Claims, 7 Drawing Sheets

(51) Int. Cl.
    *H01M 4/38*     (2006.01)
    *H01M 4/62*     (2006.01)
    *H01M 10/052*     (2010.01)
    *H01M 10/0565*     (2010.01)
    *H01M 10/0585*     (2010.01)

(52) U.S. Cl.
    CPC ..... *H01M 10/052* (2013.01); *H01M 10/0565* (2013.01); *H01M 10/0585* (2013.01); *H01M 2300/0082* (2013.01)

(56) References Cited

U.S. PATENT DOCUMENTS

| | | | |
|---|---|---|---|
| 2014/0004257 A1 | 1/2014 | Kubo et al. | |
| 2016/0079625 A1* | 3/2016 | Shon | |
| 2017/0294678 A1 | 10/2017 | Lee et al. | |
| 2017/0341854 A1* | 11/2017 | Yashiki | H01M 50/417 |
| 2017/0373300 A1 | 12/2017 | Maeda et al. | |
| 2018/0146376 A1 | 5/2018 | Jo et al. | |
| 2018/0166743 A1* | 6/2018 | Lee | H01M 10/052 |
| 2018/0287184 A1 | 10/2018 | Lee et al. | |
| 2019/0088982 A1* | 3/2019 | Sugizaki | |

FOREIGN PATENT DOCUMENTS

| | | | | |
|---|---|---|---|---|
| JP | 2006-179241 A | | 7/2006 | |
| JP | 2011-14278 A | | 1/2011 | |
| JP | 2011-119203 A | | 6/2011 | |
| JP | 2012-38425 A | | 2/2012 | |
| JP | 2014-146501 A | | 8/2014 | |
| JP | 2015195184 A | * | 11/2015 | |
| JP | 2017-216053 A | | 12/2017 | |
| KR | 10-2014-0126035 A | | 10/2014 | |
| KR | 10-1506833 B1 | | 3/2015 | |
| KR | 10-2016-0081369 A | | 7/2016 | |
| KR | 10-2016-0087115 A | | 7/2016 | |
| KR | 10-2017-0110264 A | | 10/2017 | |
| KR | 10-2017-0116464 A | | 10/2017 | |
| KR | 20170116464 A | * | 10/2017 | |
| KR | 10-2017-0139302 A | | 12/2017 | |
| KR | 10-2018-0032168 A | | 3/2018 | |
| KR | 10-2018-0036410 A | | 4/2018 | |
| WO | WO-2009113634 A1 | * | 9/2009 | ............... H01G 9/08 |

OTHER PUBLICATIONS

European Search Report for Appl. No. 19851710.4 dated Aug. 4, 2021.

* cited by examiner

PRIOR ART

PRIOR ART

ALL-SOLID-STATE BATTERY USING LITHIUM METAL FOR NEGATIVE ELECTRODE

TECHNICAL FIELD

The present application claims the benefit of Korean Patent Application No. 10-2018-0098857 filed on Aug. 23, 2018 with the Korean Intellectual Property Office, the disclosure of which is incorporated herein by reference in its entirety. The present disclosure relates to an electrode assembly for an all-solid-state battery comprising a solid electrolyte as an electrolyte material. More particularly, the all-solid-state battery uses lithium metal for a negative electrode.

BACKGROUND ART

Secondary batteries have been primarily used in small device applications such as mobile devices and laptop computers, but recently their application tends to expand to medium- and large-sized devices, in particular, the field requiring high energy and high output in relation to energy storage systems (ESSs) or electric vehicles (EVs). Compared to small ones, medium- and large-sized secondary batteries, the operating environments such as temperature and impact are severe and a larger number of batteries are used, so it is necessary to ensure safety, together with good performance and reasonable price. Most of current commercially available secondary batteries use an organic liquid electrolyte containing a lithium salt dissolved in an organic solvent, and thus there are potential risks of leaks as well as fires and explosions.

Accordingly, recently, all-solid-state batteries have been developed, and they use incombustible inorganic solid electrolytes and thus have an advantage such as higher thermal stability than the conventional lithium secondary batteries using combustible organic liquid electrolyte. In general, all-solid-state batteries have a stack structure of a negative current collector layer, a negative electrode layer, a solid electrolyte layer, a positive electrode layer and a positive current collector layer. Korean Patent No. 10-1506833 titled 'slurry, production method for solid electrolyte layer, production method for electrode active material layer and production method for all-solid-state battery' discloses an all-solid-state battery by a slurry coating process, suitable for mass production.

When an all-solid-state battery using lithium metal for a negative electrode active material is used for high capacity batteries, there is a very large volume change of the negative electrode due to lithium stripping/plating. To reduce the interfacial resistance between the negative electrode and the solid electrolyte layer (polymer electrolyte), the solid electrolyte layer material, for example, a polymer electrolyte is generally required to have high viscosity. Additionally, to increase the energy density, the solid electrolyte layer needs to be as thin as possible. Accordingly, the solid electrolyte layer is generally very sticky due to its high viscosity on the interface, and has low mechanical strength due to its small thickness. When manufacturing an electrode assembly, to perfectly align the electrodes, it is necessary to design such that the area of the negative electrode is generally larger than the area of the positive electrode, and the area of the solid electrolyte layer is larger than the area of the negative electrode. In this instance, lithium stripping/plating occurs on a region of the surface of the negative electrode where the positive electrode overlies, and lithium (Li) does not access the remaining region (a region of the negative electrode where the positive electrode does not overlie). Accordingly, when considering a charging situation, plating occurs on the lithium (Li) metal layer, and lithium metal becomes thicker at the region where the positive electrode overlies due to the lithium (Li) plating. In this instance, a step is formed between the region where the positive electrode overlies and the remaining region, causing damage in the solid electrolyte layer. FIG. 1 is a schematic cross-sectional view of the electrode assembly for the all-solid-state battery of conventional shape according to the related art, and the electrode assembly comprise the positive electrode 10, the negative electrode 40 and the solid electrolyte 20 interposed between the positive electrode and the negative electrode. As the all-solid-state battery is repeatedly charged/discharged, lithium plating 50 occurs on the lithium metal layer of the negative electrode, and lithium metal becomes thicker at the region of the negative electrode where the positive electrode overlies, forming a step in the negative electrode layer. FIG. 2 is a diagram showing the step formed in the negative electrode layer of the conventional all-solid-state battery during charging. Further, there is a high likelihood that the polymer based solid electrolyte layer may be damaged when manufacturing the electrode assembly, causing a short circuit between the positive electrode and the negative electrode at the edge of the solid electrolyte layer.

DISCLOSURE

Technical Problem

The present disclosure is directed to providing an electrode assembly for an all-solid-state battery with improved safety. Particularly, the present disclosure is directed to providing an electrode assembly of a new structure for an all-solid-state battery designed to prevent the damage of a solid electrolyte layer caused by a step formed in a negative electrode layer due to changes in thickness of a negative electrode layer, such as an increase or decrease in thickness at part of the negative electrode layer, during charging/discharging. Additionally, it will be easily understood that these and other objects and advantages of the present disclosure can be realized by means or methods set forth in the appended claims and their combination.

Technical Solution

The present disclosure relates to an all-solid-state battery. A first aspect of the present disclosure relates to the all-solid type battery comprising an electrode assembly comprising a negative electrode, a positive electrode and a solid electrolyte layer interposed between the positive electrode and the negative electrode, the negative electrode comprising lithium metal as a negative electrode active material, wherein the solid electrolyte layer, the negative electrode and the positive electrode have equal area or the solid electrolyte layer, the negative electrode and the positive electrode reduce in area in that order on the basis of an area of a stacked surface, the negative electrode is in surface contact with the solid electrolyte layer and disposed within the surface of the solid electrolyte layer, the positive electrode is in indirect contact with the negative electrode wherein the solid electrolyte layer is interposed between the positive electrode and the negative electrode and disposed within the surface of the negative electrode, the electrode assembly further comprises a protective layer comprising polymer resin between the negative electrode and the solid electrolyte layer, the protective layer is in a shape of a frame with an edge portion having a predetermined width and an opening surrounded by the edge portion, an area of the opening is smaller than an area of the positive electrode, and the protective layer is placed such that the opening is disposed within the positive electrode surface.

According to a second aspect of the present disclosure, in the first aspect, the solid electrolyte layer comprises a polymer based solid electrolyte.

According to a third aspect of the present disclosure, in any one of the above-described aspects, the polymer based solid electrolyte comprises at least one selected from polyether based polymer, polycarbonate based polymer, acrylate based polymer, polysiloxane based polymer, phosphazene based polymer, a polyethylene derivative and an alkylene oxide derivative.

According to a fourth aspect of the present disclosure, in any one of the above-described aspects, an outer periphery of the negative electrode is not in direct contact with the solid electrolyte layer by the edge portion.

According to a fifth aspect of the present disclosure, in any one of the above-described aspects, a thickness of the protective layer is $1/10$ to $1/2$ of a thickness of the solid electrolyte layer.

According to a sixth aspect of the present disclosure, in any one of the above-described aspects, the edge portion of the protective layer extends outward from the solid electrolyte layer by a predetermined width.

According to a seventh aspect of the present disclosure, in any one of the above-described aspects, the positive electrode is stacked such that an outer periphery of the positive electrode is disposed within the edge portion of the protective layer.

According to an eighth aspect of the present disclosure, in any one of the above-described aspects, the solid electrolyte layer, the negative electrode and the positive electrode have equal area on the basis of the area of the stacked surface, an outer region having a predetermined width in the edge portion of the protective layer extends outward from the solid electrolyte layer, and the region extending outward is bent toward the solid electrolyte layer and surrounds a side of a stack of the solid electrolyte layer and the positive electrode.

According to a ninth aspect of the present disclosure, in any one of the above-described aspects, the protective layer is bent such that an end of the region extending outward covers an outer periphery of the positive electrode surface in whole or in part.

According to a tenth aspect of the present disclosure, in any one of the above-described aspects, the protective layer comprises at least one of polyethylene and polypropylene.

Advantageous Effects

In the present disclosure, the polyolefin protective layer has higher mechanical strength, lower flexibility and lower viscosity than the solid electrolyte layer. Accordingly, because the electrode assembly according to the present disclosure comprises the frame type protective layer, even if lithium plating occurs on a region of the negative electrode layer surface where the positive electrode overlies (an inner region of the negative electrode surface), causing the formation of a step between the outer periphery of the negative electrode surface and the inner surface surrounded by the outer periphery, the protective layer moves up along the step, and with the movement of the protective layer, the outer region of the electrolyte membrane is supported by the protective layer and moves up together, thereby preventing the damage of the solid electrolyte layer caused by the plating and the consequential step.

BRIEF DESCRIPTION OF DRAWINGS

The accompanying drawings illustrate a preferred embodiment of the present disclosure, and together with the above detailed description, serve to provide further understanding of the technical aspects of the present disclosure, and thus, the present disclosure should not be construed as being limited to the drawings. Meanwhile, the shape, size, scale or proportion of the elements in the drawings as used herein may be exaggerated to emphasize clearer description.

MODE FOR DISCLOSURE

Figure 1:
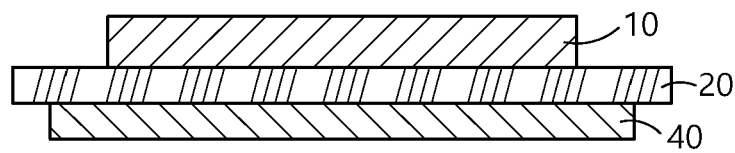
FIG. 1 is a cross-sectional view of an electrode assembly for an all-solid-state battery according to the related art.
Figure 2:
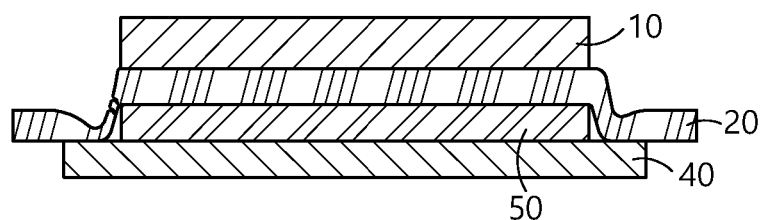
FIG. 2 is a schematic cross-sectional view of an electrode assembly for an all-solid-state battery according to the related art, showing that lithium plating occurs on the surface of the negative electrode and the negative electrode becomes thicker due to the repeated charging/discharging of the battery.

Hereinafter, the present disclosure will be described in detail. Prior to the description, it should be understood that the terms or words used in the specification and the appended claims should not be construed as limited to general and dictionary meanings, but interpreted based on the meanings and concepts corresponding to the technical aspects of the present disclosure on the basis of the principle that the inventor is allowed to define terms appropriately for the best explanation. Therefore, the embodiments described herein and illustrations shown in the drawings are just a most preferred embodiment of the present disclosure, but not intended to fully describe the technical aspects of the present disclosure, so it should be understood that other equivalents and modifications could be made thereto at the time the application was filed.

The term [comprises] when used in this specification, specifies the presence of stated elements, but does not preclude the presence or addition of one or more other elements, unless the context clearly indicates otherwise.

The terms [about] and [substantially] are used herein in the sense of at, or nearly at, when given the manufacturing and material tolerances inherent in the stated circumstances and are used to prevent the unscrupulous infringer from unfairly taking advantage of the present disclosure where exact or absolute figures are stated as an aid to understanding the present disclosure.

[A and/or B] when used in this specification, specifies [either A or B or both].

In the following detailed description, specific terms are used for convenience and are not limiting. The terms 'inner', 'outer' 'right', 'left' 'upper' and 'lower' refer to the directions in the drawings to which reference is made. The terms 'inward' and 'outward' refer to the directions toward or away from the geometrical centers of the designated devices, systems and members thereof. The terms 'front', 'rear', 'up', 'down' and related words and phrases refer to the locations and directions in the drawings to which reference is made and are not limiting. These terms comprise the above-listed words and their derivatives and synonyms.

The present disclosure relates to an electrode assembly for an electrochemical device. In the present disclosure, the electrochemical device is a device that converts chemical energy to electrical energy by electrochemical reactions, and is a concept encompassing primary batteries and secondary batteries, and the secondary batteries can be recharged, and they are a concept encompassing lithium ion batteries, nickel-cadmium batteries and nickel-hydrogen batteries. In an embodiment of the present disclosure, the electrochemical device may be a lithium ion battery, and preferably an all-solid-state battery using a solid electrolyte as an electrolyte. In the present disclosure, the all-solid-state battery is preferably a lithium metal battery using lithium metal for a negative electrode.

Figure 3A:
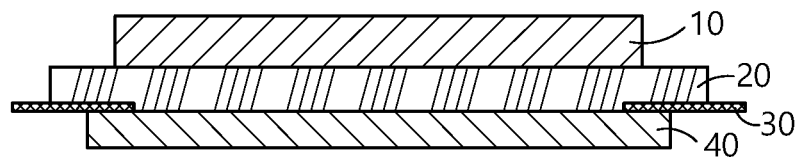
FIG. 3a is a schematic cross-sectional view of an electrode assembly for an all-solid-state battery according to an embodiment of the present disclosure.
Figure 3B:
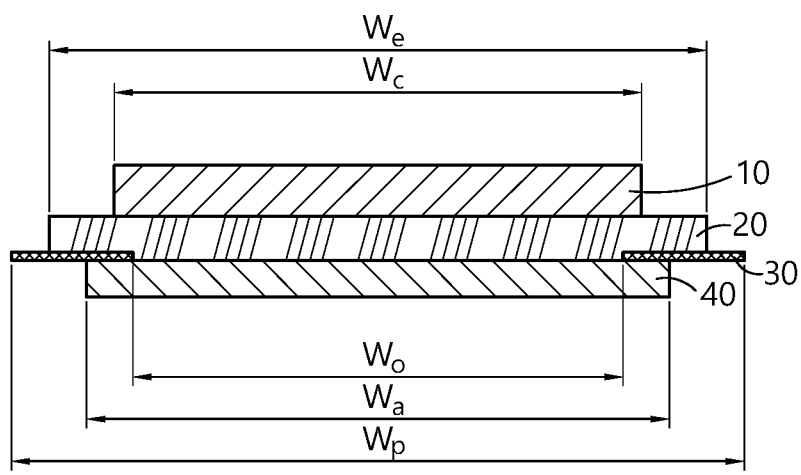
FIG. 3b shows the width of each element.

The electrode assembly of the present disclosure will be described in more detail with reference to the accompanying drawings. FIGS. 3a and 3b are schematic cross-sectional views of the electrode assembly for an all-solid-state battery according to an embodiment of the present disclosure. In an embodiment of the present disclosure, the electrode assembly comprises a positive electrode 10, a negative electrode 40 and a solid electrolyte layer 20 interposed between the positive electrode and the negative electrode, with a protective layer 30 having a predetermined width between the negative electrode and the solid electrolyte layer.

In the electrode assembly, the solid electrolyte layer, the negative electrode and the positive electrode reduces in the area in that order on the basis of the area of the stacked surface. The negative electrode is in surface contact with the solid electrolyte layer, and disposed within the solid electrolyte layer surface, and thus does not extend outward from the solid electrolyte layer. Additionally, the positive electrode is in indirect contact with the negative electrode wherein the solid electrolyte layer is interposed between the positive electrode and the negative electrode, and disposed within the surface of the negative electrode. FIGS. 3a and 3b are cross-sectional views of the electrode assembly according to an embodiment of the present disclosure, in which two ends of the positive electrode surface are disposed within the width of the negative electrode surface, and two ends of the negative electrode surface are disposed within the width of the solid electrolyte layer surface.

In an embodiment of the present disclosure, the positive electrode comprises a positive current collector and a positive electrode active material layer comprising a positive electrode active material and a solid electrolyte on at least one surface of the current collector. The positive electrode active material layer may further comprise a conductive material and a binder resin, if necessary. The positive electrode active material may comprise, but is not limited to, at least one of layered compounds such as lithium manganese composite oxide ($LiMn_2O_4$, $LiMnO_2$), lithium cobalt oxide ($LiCoO_2$), lithium nickel oxide ($LiNiO_2$) or compounds with one or more transition metal substitution; lithium manganese oxide of formula $Li_{1+x}Mn_{2-x}O_4$ (x=0~0.33), $LiMnO_3$, $LiMn_2O_3$, $LiMnO_2$; lithium copper oxide ($Li_2CuO_2$); vanadium oxide such as $LiV_3O_8$, $LiV_3O_4$, $V_2O_5$, $Cu_2V_2O_7$; lithium nickel oxide represented by chemical formula $LiNi_{1-x}M_xO_2$ (M=Co, Mn, Al, Cu, Fe, Mg, B or Ga, x=0.01~0.3); lithium manganese composite oxide represented by chemical formula $LiMn_{2-x}M_xO_2$ (M=Co, Ni, Fe, Cr, Zn or Ta, x=0.01~0.1), $Li_aMn_xNi_yCo_zO_2$ (0.5<a<1.5, 0<[x,y,z]<1, x+y+z=1) or $Li_2Mn_3MO_8$ (M=Fe, Co, Ni, Cu or Zn); $LiMn_2O_4$ with partial substitution of alkali earth metal ion for Li in chemical formula; disulfide compounds; $Fe_2(MoO_4)_3$.

In an embodiment of the present disclosure, there is no particular limitation on the positive electrode active material, but the positive electrode active material may have the particle diameter (D50) of 1 μm to 20 μm. It should be understood that the 'particle diameter' as used herein refers to D50, the particle diameter at 50% in a particle size distribution curve.

In the present disclosure, the negative electrode may comprise a negative current collector and a negative electrode active material layer comprising a negative electrode active material on at least one surface of the current collector. In the present disclosure, the negative electrode active material layer comprises lithium metal, and may be prepared by attaching a lithium metal film of a predetermined thickness to the surface of the current collector or depositing lithium metal on the surface of the current collector by a chemical or physical method. Alternatively, the negative electrode active material layer may be formed by compressing lithium metal powder into a layered structure on the surface of the current collector. In an embodiment of the present disclosure, the lithium metal film may be 1 μm to 20 μm in thickness.

In addition to the lithium metal, the negative electrode material may further comprise other active material. Its non-limiting examples may comprise carbon such as lithium metal oxide, nongraphitizable carbon, graphite based carbon; metal composite oxide such as $Li_xFe_2O_3$ (0≤x≤1), $Li_xWO_2$ (0≤x≤1), $Sn_xMe_{1-x}Me'_yO_z$ (Me: Mn, Fe, Pb, Ge; Me': Al, B, P, Si, elements in Groups 1, 2 and 3 of the periodic table, halogen; 0<x≤1; 1≤y≤3; 1≤z<8); lithium metal; lithium alloy; silicon based alloy; tin based alloy; metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymer such as polyacetylene; Li—Co—Ni based material; titanium oxide, used singly or in combination. The negative electrode active material layer may further comprise a conductive material and a binder resin, if necessary.

In a particular embodiment of the present disclosure, the conductive material may be, for example, at least one conductive material selected from the group consisting of at least one selected from the group consisting of graphite, carbon black, carbon fiber or metal fiber, metal powder, conductive whisker, conductive metal oxide, activated carbon and polyphenylene derivative. In more detail, the conductive material may be at least one conductive material selected from the group consisting of natural graphite, artificial graphite, super-p, acetylene black, ketjen black, channel black, furnace black, lamp black, thermal black, denka black, aluminum powder, nickel powder, zinc oxide, potassium titanate and titanium oxide.

The current collector is not limited to a particular type and comprises those having high conductivity while not causing a chemical reaction to the corresponding battery, and may comprise, for example, stainless steel, copper, aluminum, nickel, titanium, sintered carbon, or aluminum or stainless steel treated with carbon, nickel, titanium and silver on the surface.

The binder resin may comprise polymers commonly used in electrodes in the technical field pertaining to the present disclosure. Non-limiting examples of the binder resin may comprise polyvinylidene fluoride-co-hexafluoropropylene, polyvinylidene fluoride-co-trichloroethylene, polymethylmethacrylate, polyethylhexyl acrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan and carboxyl methyl cellulose, but are not limited thereto.

The solid electrolyte comprised in the positive electrode and/or the negative electrode may comprise at least one selected from a polymer based solid electrolyte, a sulfide based solid electrolyte and an oxide based solid electrolyte.

In the present disclosure, the electrode assembly may further comprise the protective layer 30 between the negative electrode and the solid electrolyte layer. The protective layer 30 is in the shape of a frame having a predetermined width, and comprises an edge portion 32 having an inner periphery and an outer periphery, and an opening 31 surrounded by the edge portion. Here, the area of the opening 31 is smaller than the area of the positive electrode, and the protective layer is placed such that the opening is disposed within the surface of the positive electrode layer. That is, the outer periphery of the positive electrode is disposed within the edge portion of the protective layer, in other words, the positive electrode and the edge portion of the protective layer overlap on the basis of the vertical cross section. Referring back to FIGS. 3a and 3b, in the electrode assembly, the width Wo between two ends of the opening of the solid electrolyte layer is disposed within the width Wc between two ends of the positive electrode layer. In the present disclosure, the full width Wp of the protective layer may be equal to or larger than the width Wa of the negative electrode layer, and according to an embodiment of the present disclosure, the width Wp may be equal to or larger than the width We of the solid electrolyte layer. For example, the edge portion of the protective layer may extend outward from the solid electrolyte layer by a predetermined width.

Figure 5:
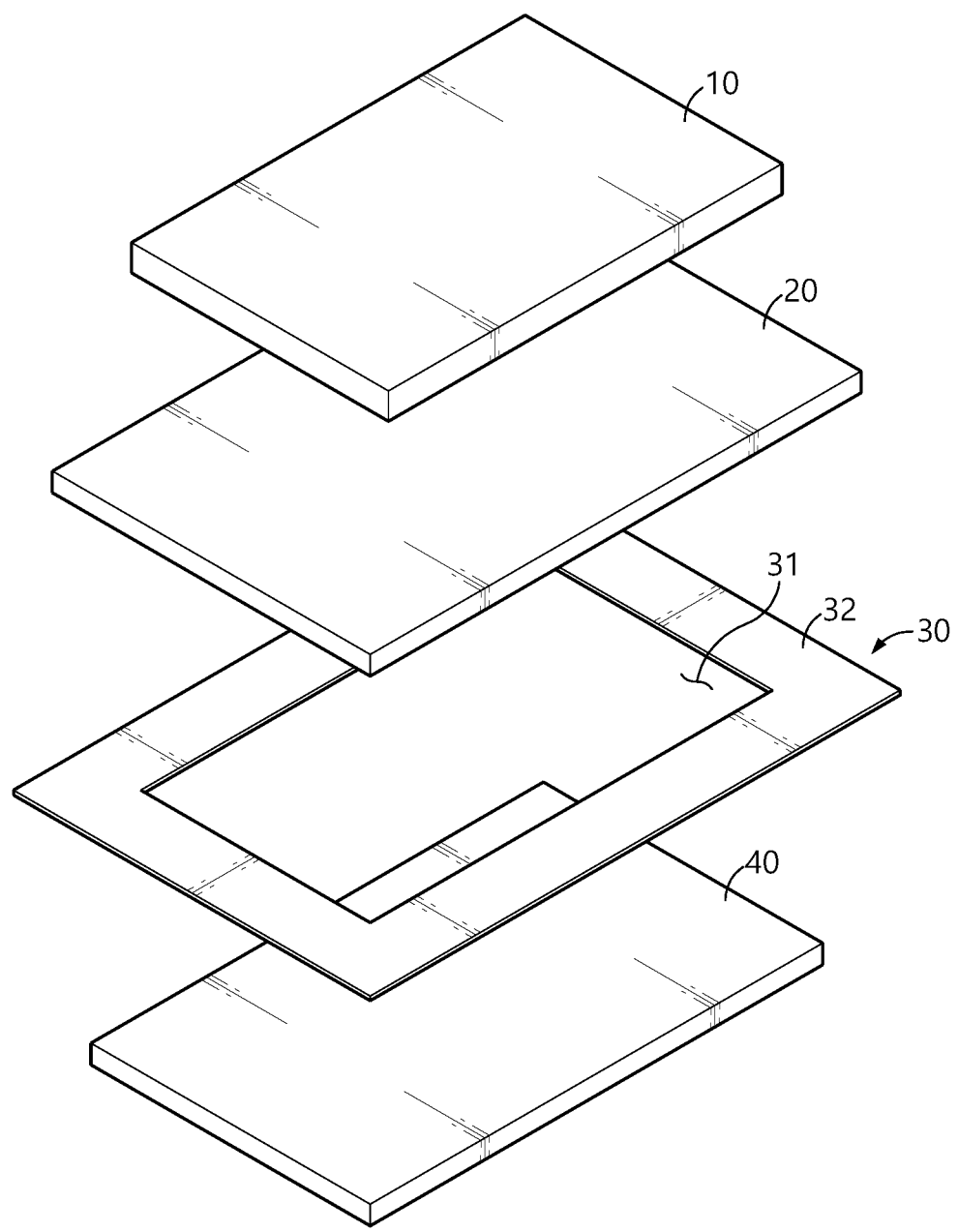
FIG. 5 is an exploded perspective view of an electrode assembly for an all-solid-state battery according to an embodiment of the present disclosure.

In the present disclosure, the protective layer 30 does not cover the entire surface between the negative electrode 40 and the solid electrolyte layer 20, and is installed as much as a predetermined width inward of the negative electrode surface from the edge of the negative electrode 40. Due to this structural feature, the outer periphery of the negative electrode is not in direct contact with the solid electrolyte. In a preferred aspect, the protective layer may be installed with the predetermined width on the outer periphery of the negative electrode surface. FIG. 5 is an exploded perspective view of the electrode assembly according to an embodiment of the present disclosure, and it can be seen that the protective layer 30 has the frame portion 32 in the shape of a single closed loop and the opening 31 surrounded by the frame portion.

Figure 4:
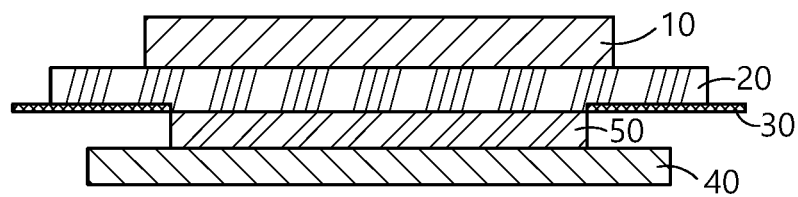
FIG. 4 is a cross-sectional view of an electrode assembly for an all-solid-state battery according to an embodiment of the present disclosure, showing that lithium plating occurs on the surface of the negative electrode and the negative electrode becomes thicker due to the repeated charging/discharging of the battery.

FIG. 4 is a schematic diagram showing that lithium plating occurs in the negative electrode and a step is formed on the negative electrode surface due to the repeated charging/discharging of the battery. According to this, lithium plating only occurs at a region of the negative electrode surface where the positive electrode overlies and lithium plating does not occur around the outer periphery of the negative electrode, and thus a step is formed between the inner region and the outer region of the surface of the negative electrode. When the step is formed on part of the negative electrode surface, the protective layer 30 having higher stiffness and/or strength than the solid electrolyte layer is not bent by the step and maintains the flat shape, and moves up as much as the step where lithium plating occurred. Additionally, accordingly, the solid electrolyte layer is supported by the protective layer, and thus it is not bent to conform to the shape of the step and moves up together with the protective layer while maintaining a flat shape.

In the present disclosure, the thickness of the protective layer is $\frac{1}{10}$ to $\frac{1}{2}$ of the thickness of the solid electrolyte layer, but is not limited thereto.

The above description is made based on the horizontal cross section A of the electrode assembly, but is also applied to the vertical cross section B.

In an embodiment of the present disclosure, the protective layer may be a film type layer comprising polymer resin. Preferably, the polymer resin has less or no reactivity with the solid electrolyte layer. Additionally, for mechanical strength, shape stability and safety in battery use, the melting point may be 100° C. or above, and the glass transition temperature (Tg) may be −30° C. to 200° C. In an embodiment of the present disclosure, the protective layer may comprise a polyolefin based polymer resin. The polyolefin based polymer resin may comprise, for example, at least one polymer or copolymer selected from the group consisting of ethylene, propylene, 1-butene, 4-methyl-1-pentene, 1-hexene and 1-octene, or their combination, used singly or in combination. Together with or independently of the polyolefin based polymer resin, the protective layer may comprise at least one selected from the group consisting of polyethyleneterephthalate, polybutyleneterephthalate, polyester, polyacetal, polyamide, polycarbonate, polyimide, polyetheretherketone, polyethersulfone, polyphenyleneoxide, polyphenylenesulfidro, polyethylenenaphthalene, polysulfone, cellulose acetate and polystyrene. However, the material of the protective layer is not limited to those described above, and comprises any type of material that has shape stability enough to prevent the shape deformation of the solid electrolyte layer and is electrochemically stable. For example, the protective layer may comprise polyethylene and/or polypropylene.

In an embodiment of the present disclosure, the solid electrolyte layer is interposed between the positive electrode and the negative electrode to electrically isolate the two electrodes and serves as an ion conducting layer. The solid electrolyte layer preferably has the ionic conductivity of $1.0 \times 10^{-5}$ S/cm or more, $1.0 \times 10^{-4}$ S/cm or more, or $1.0 \times 10^{-3}$ S/cm or more, but is not limited thereto. Additionally, In an embodiment of the present disclosure, the solid electrolyte layer is preferably about 10 μm to 100 μm in thickness, and may be prepared as a freestanding film.

In an embodiment of the present disclosure, the solid electrolyte layer may comprise a polymer based solid electrolyte as an ion conducting material. The polymer based solid electrolyte may comprise a polymer electrolyte formed by adding polymer resin to a solvated lithium salt, and the polymer resin may comprise at least one selected from the group consisting of polyether based polymer, polycarbonate based polymer, acrylate based polymer, polysiloxane based polymer, phosphagen based polymer, polyethylene derivative, polyethylene oxide, polyethylene glycol, alkylene oxide derivative, phosphoric acid ester polymer, poly agitation lysine, polyester sulfide, polyvinyl alcohol, polyvinylidene fluoride and polymer containing ionic dissociation groups.

In the electrolyte of the present disclosure, the above-described lithium salt is an ionizable lithium salt that may be represented by Li "X". The anion X of the lithium salt is not limited to a particular type, but may comprise, for example, $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, and at least one of them may be used.

In the electrode assembly, before forming the solid electrolyte layer on the surface of the negative electrode, the protective layer may be placed at a predetermined location of the surface of the negative electrode, the solid electrolyte layer may be formed, and the positive electrode may be placed. In this instance, after placing the positive electrode, a hot or cool pressing process may be performed to bind each layer, and during this pressure fixing, the opening of the protective layer may be filled with the solid electrolyte layer. That is, in an embodiment of the present disclosure, the solid electrolyte layer may have a step as much as the thickness of the protective layer.

In an embodiment of the present disclosure, the protective layer is wider than the solid electrolyte layer, and thus an outer region having a predetermined width in the edge portion of the protective layer may extend outward from the solid electrolyte layer. In this case, the outer region extending outward may be bent toward the solid electrolyte layer to cover the side of the stack of the solid electrolyte layer and the positive electrode. In this case, the solid electrolyte layer and the positive electrode in contact with the solid electrolyte layer may be designed with the same area, i.e., horizontal and vertical dimensions on the basis of the area of the stacked surface, to prevent the misalignment of the solid electrolyte layer and the positive electrode. Further, the solid electrolyte layer, the positive electrode and the negative electrode may be designed with equal area, i.e., horizontal and vertical dimensions. When the positive electrode and the negative electrode having equal area are stacked in alignment with each other, the side of the positive electrode is covered with the protective layer, thereby preventing the electrical interference, and there is no need to design such that any one electrode is larger, thereby improving the energy density and reducing the material. As the width of the region of the protective layer extending outward is longer than the width of the side of the stack, the remaining part after covering the side of the stack, if any, may be cut to remove or may be bent toward the surface of the positive electrode to cover the outer periphery of the positive electrode surface in whole or in part for finishing.

Figure 6:
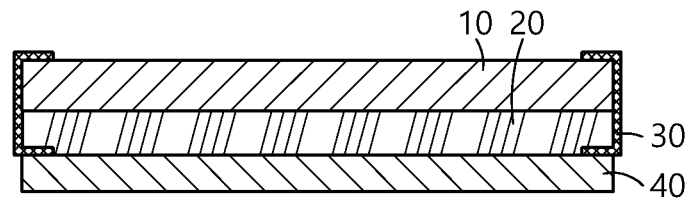
FIG. 6 shows an electrode assembly for an all-solid-state battery according to an embodiment of the present disclosure, in which an outer region having a predetermined width in an edge portion of a protective layer extends outward from a solid electrolyte layer and covers the side of a stack of the solid electrolyte layer and the positive electrode.

FIG. 6 is a schematic diagram showing the electrode assembly comprising the solid electrolyte layer, the positive electrode and the negative electrode having the same size aligned to each other, in which parts of the solid electrolyte layer, the positive electrode and the protective layer extending outward are bent to cover the side of the stack of the positive electrode and the solid electrolyte, and the remaining end is attached to the positive electrode surface for finishing.

The present disclosure further provides a battery module comprising the battery comprising the electrode assembly as a unit battery, a battery pack comprising the battery module and a device comprising the battery pack as a power source. Specific examples of the device comprise power tools that operate with power from an electric motor; electric vehicles comprising Electric Vehicles (EVs), Hybrid Electric Vehicles (HEVs) and Plug-in Hybrid Electric Vehicles (PHEVs); electric two wheelers comprising E-bikes and E-scooters; electric golf carts; and ESSs, but are not limited thereto.

Although the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

What is claimed is:

1. An all-solid type battery, comprising:
   an electrode assembly comprising:
      (i) a negative electrode,
      (ii) a positive electrode,
      (iii) a solid electrolyte layer interposed between the positive electrode and the negative electrode, and
      (iv) a protective layer interposed between the negative electrode and the solid electrolyte layer,
   wherein the solid electrolyte layer, the negative electrode and the positive electrode have equal area, or the solid electrolyte layer, the negative electrode and the positive electrode reduce in area in that order on the basis of an area of a stacked surface,
   wherein the negative electrode comprises lithium metal as a negative electrode active material,
   wherein the negative electrode is in surface contact with the solid electrolyte layer, and disposed within the surface of the solid electrolyte layer,
   wherein the positive electrode is in indirect contact with the negative electrode,
   wherein the positive electrode is disposed within the surface of the negative electrode,
   wherein the protective layer is in a shape of a frame having a predetermined width and an inner edge, wherein an opening is defined by the inner edge,
   wherein a surface area from a top view perspective of the opening is smaller than a surface area from the top view perspective of the positive electrode,
   wherein the protective layer is placed such that the opening is disposed within a perimeter of the positive electrode surface from a top view perspective, and
   wherein the protective layer comprises a polyolefin-based polymer resin and has higher stiffness and/or strength than the solid electrolyte layer, and wherein the solid electrolyte layer comprises a polymer based solid electrolyte.

2. The all-solid type battery according to claim 1, wherein the solid electrolyte layer comprises a polymer based solid electrolyte.

3. The all-solid type battery according to claim 2, wherein the polymer based solid electrolyte comprises at least one selected from the group consisting of a polyether based polymer, a polycarbonate based polymer, an acrylate based polymer, a polysiloxane based polymer, a phosphagen based polymer, a polyethylene derivative and an alkylene oxide derivative.

4. The all-solid type battery according to claim 1, wherein an outer periphery of the negative electrode is not in direct contact with the solid electrolyte layer, and is in contact with the edge portion of the protective layer.

5. The all-solid type battery according to claim 1, wherein a thickness of the protective layer is 1/10 to 1/2 of a thickness of the solid electrolyte layer.

6. The all-solid type battery according to claim 1, wherein the edge portion of the protective layer extends outward beyond the solid electrolyte layer by a predetermined width.

7. The all-solid type battery according to claim 1, wherein the positive electrode is stacked such that an outer periphery of the positive electrode is disposed within the edge portion of the protective layer.

8. The all-solid type battery according to claim 1, wherein the solid electrolyte layer, the negative electrode and the positive electrode have equal surface area from the top view perspective on the basis of the surface area from the top view perspective of the stacked surface,
wherein an outer region having a predetermined width in the edge portion of the protective layer extends outward from the solid electrolyte layer, and
wherein the region extending outward is bent toward the solid electrolyte layer and surrounds a side of a stack of the solid electrolyte layer and the positive electrode.

9. The all-solid type battery according to claim 8, wherein the protective layer is bent such that an end of the region extending outward covers an outer periphery of the positive electrode surface in whole or in part.

10. The all-solid type battery according to claim 1, wherein the protective layer comprises at least one of polyethylene and polypropylene.

11. The all-solid type battery according to claim 1, wherein the solid electrolyte layer, the negative electrode and the positive electrode have equal surface area from the top view perspective.

12. The all-solid type battery according to claim 1, wherein the solid electrolyte layer, the negative electrode and the positive electrode reduce in surface area from the top view perspective in that order on the basis of a surface area from the top view perspective of a stacked surface.

13. The all-solid type battery according to claim 1, wherein two ends of the positive electrode surface are disposed within the width of the negative electrode surface, and two ends of the negative electrode surface are disposed within the width of the solid electrolyte layer surface.

14. The all-solid type battery according to claim 1, wherein the protective layer comprises a film type layer comprising the polyolefin-based polymer resin.

15. The all-solid type battery according to claim 1, wherein the polyolefin-based polymer resin comprises at least one polymer or copolymer prepared from at least one selected from the group consisting of ethylene, propylene, 1-butene, 4-methyl-1-pentene, 1-hexene, 1-octene, and mixtures thereof.

16. The all-solid type battery according to claim 1, wherein the protective layer further comprises at least one polymer selected from the group consisting of polyethyleneterephthalate, polybutyleneterephthalate, polyester, polyacetal, polyamide, polycarbonate, polyimide, polyetheretherketone, polyethersulfone, polyphenyleneoxide, polyphenylenesulfidro, polyethylenenaphthalene, polysulfone, cellulose acetate and polystyrene.

17. A battery module comprising at least one all-solid type battery according to claim 1.

18. A battery pack comprising at least one all-solid type battery according to claim 1.

19. A device comprising at least one all-solid type battery according to claim 1.

* * * * *